(12) United States Patent
Hammond et al.

(10) Patent No.: US 7,097,227 B2
(45) Date of Patent: Aug. 29, 2006

(54) UPHOLSTERED VISOR WITH MAP STRAP

(75) Inventors: Christopher R. Hammond, Rochester Hills, MI (US); Donald J. Woodward, Shelby Township, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 7 days.

(21) Appl. No.: 11/015,135

(22) Filed: Dec. 17, 2004

(65) Prior Publication Data

US 2006/0131916 A1    Jun. 22, 2006

(51) Int. Cl.
*B60J 3/00*    (2006.01)
(52) U.S. Cl. .................... 296/97.5; 296/1.07; 296/97.1
(58) Field of Classification Search ............... 296/97.1, 296/97.5, 1.07
See application file for complete search history.

(56) References Cited

U.S. PATENT DOCUMENTS

| | | | |
|---|---|---|---|
| 2,517,337 A | 8/1950 | Nodle | |
| 2,721,409 A | 10/1955 | Bland | |
| 3,430,299 A | 3/1969 | Copen | |
| 3,809,428 A | 5/1974 | Cohen | |
| 4,781,409 A | 11/1988 | Harbison | |
| 4,998,767 A * | 3/1991 | Lawassani et al. | 296/97.1 |
| 5,402,924 A | 4/1995 | Gilson | |
| 5,429,335 A | 7/1995 | Cunningham | |
| 5,947,545 A | 9/1999 | Akagi et al. | |
| 5,951,090 A | 9/1999 | Wilson et al. | |
| D475,342 S | 6/2003 | Mielnik | |

* cited by examiner

*Primary Examiner*—Jason Morrow
(74) *Attorney, Agent, or Firm*—Raggio & Dinnin, P.C.

(57) ABSTRACT

A visor assembly having a slip-on upholstered sleeve and a mating snap-in stretchable accessory band for holding maps and the like.

9 Claims, 2 Drawing Sheets

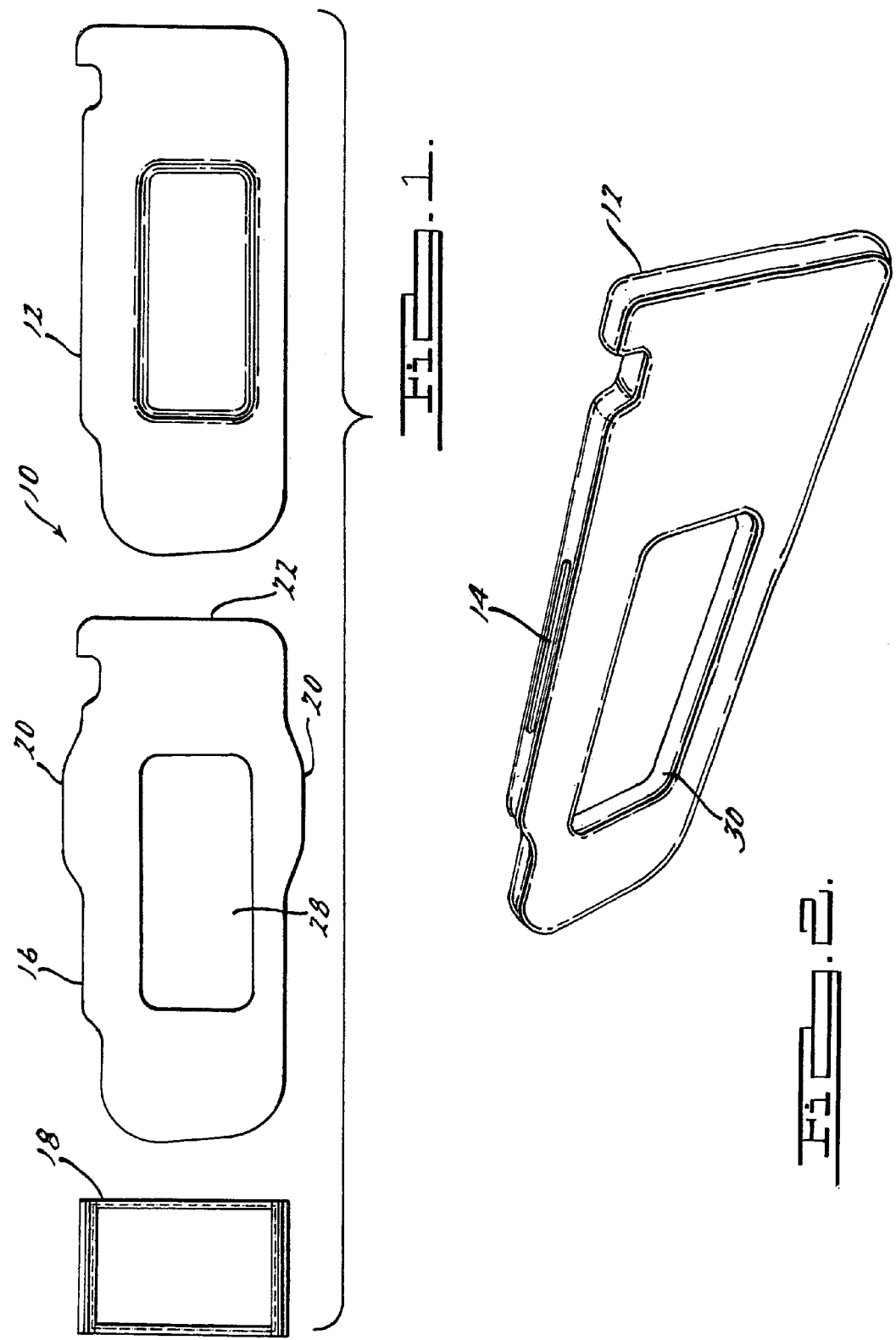

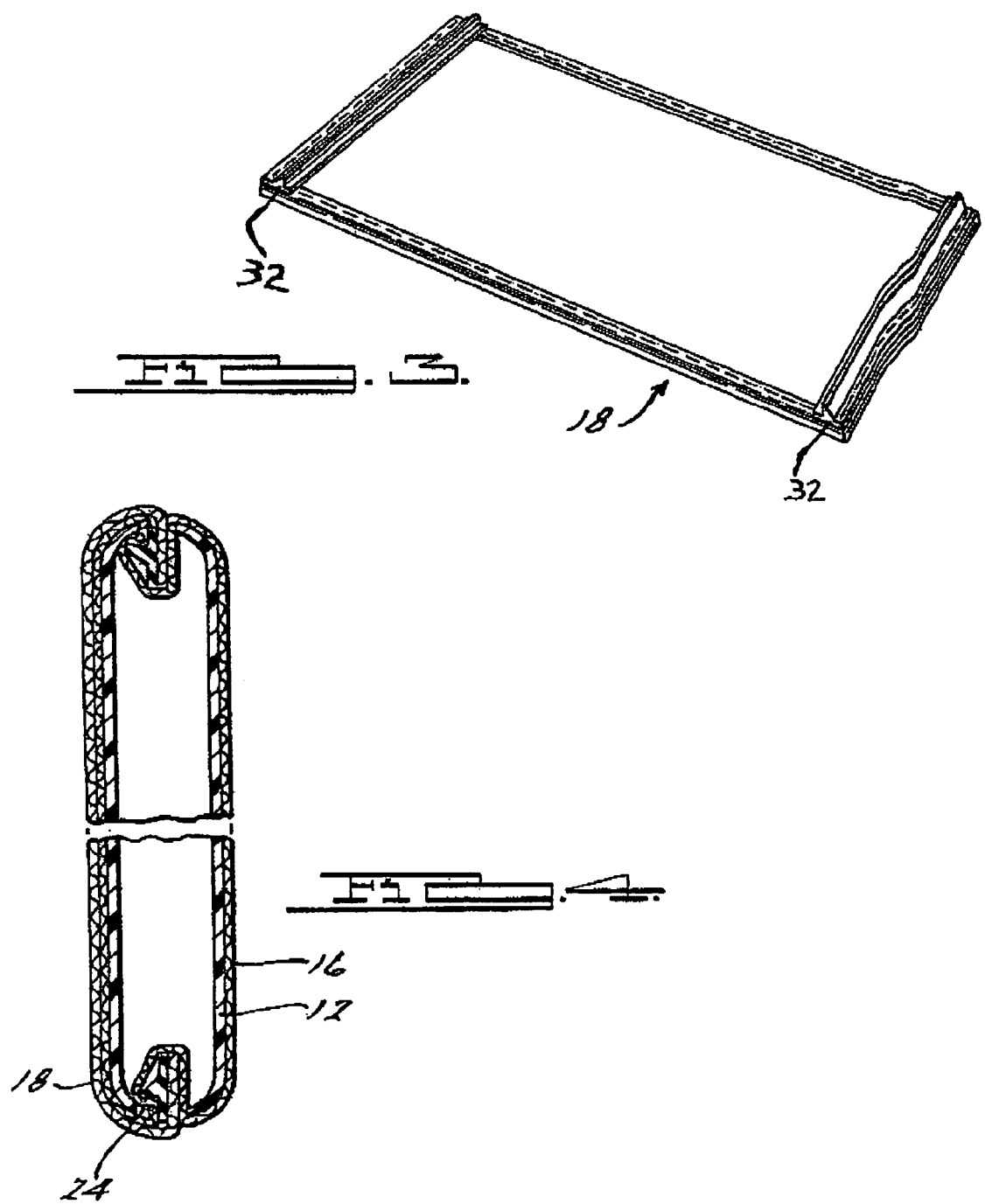

UPHOLSTERED VISOR WITH MAP STRAP

BACKGROUND OF THE INVENTION

Sun visors are standard equipment in the automobile industry. There is a tension between reducing the cost of the visor, and providing a visor that is most useful and which appears to be expensive and luxurious. It is preferable that the visor match the appearance of the interior trim of the vehicle. In particular, it is preferable to have the visor have an upholstered cover which matches the upholstery of the ceiling panel of the interior of the vehicle. It is further desirable to provide a vanity mirror and light source on the face of the visor facing inward when the visor is moved from its stowed position to allow a passenger to view him or herself. Another popular accessory on a visor is a flexible map strap which typically circumvents the face of the visor opposite the vanity mirror, which provides convenient stowage of items such as maps, toll tickets, sunglasses or other similar light devices. Typically, the map band is secured to the visor body, but in a manner which makes it difficult to upholster the visor body. Stitching the map end to the upholstery can be time consuming and expensive, and can provide a less than satisfactory securing. Wherefore, there is a need in the art to provide an upholstered visor cover which provides for a mirror vanity and an elastic map strap which is inexpensive to manufacture and readily manufactured.

SUMMARY OF THE INVENTION

It is an object of the present invention to provide an upholstered visor that can be inexpensively and easily manufactured.

It is a further object of the present invention to provide a visor with an elastic map strap which is securely fastened to the visor body.

It is still a further object of the present invention to provide a visor with a map strap which may be mounted through the upholstery to the visor body with a simple insertion force, with no further securing means required.

It is a further object of the present invention to provide an upholstered visor cover having a vanity assembly and a map strap which may be mounted through the upholstery to the visor body.

The above objects and other objects are realized in accordance with the present invention by providing a visor body having opposed slots for receiving a map end and an opening for receiving a mirror assembly. An upholstered sleeve with mating openings is inserted over the visor body, and the visor assembly and map band are inserted into the apertures. The map band has a latching mechanism at each end of the band such that when inserted into the apertures of the visor body each end is securely locked into place.

Other objects, advantages and features of the present invention will be apparent to one that is skilled in the art from the following detailed description and drawings.

BRIEF DESCRIPTION OF THE DRAWINGS

FIG. 1 is an exploded view of a visor assembly according to the present invention.

FIG. 2 is a perspective view of a visor body according to the present invention.

FIG. 3 is a perspective view of the map band of FIG. 1.

FIG. 4 is a cross sectional view of the assembled visor assembly of FIG. 1.

DETAILED DESCRIPTION OF THE INVENTION

FIG. 1 illustrates a visor assembly 10 according to the present invention. The visor assembly 10 generally comprises three components, the visor body 12, the visor cover or sock 16 and the map band 18. The visor body 12 has a representative shape but can be of any shape suitable for the desired application. The body 12 contains an opening 30 to receive a mirror assembly. The visor body 12 further has a pair of elongated slots 14 at each of the opposing elongated edges for anchoring an accessory or map strap 18. The opposing slots are generally centrally located upon the visor body but can be located along the edges such that the map strap 18 can be located where desired. The visor body 12 is preferably formed of molded plastic, and preferably formed into halves which can be easily assembled together as is known in the art.

The visor cover or sock 16 is preferably of a cloth similar in appearance with the automobile interior and has an opening 28 corresponding to the opening 30 in the visor body 12 for the mirror assembly. The sock 16 further has a pair of opposing openings 20 which correspond to the slots 14 in the visor body. As can be seen from FIG. 1 there is additional material around the portions 20 of the visor sock 16 so that when the sock is placed over the visor body 12 the additional material can be tucked into the slots 14. The sock material is preferably somewhat elastic to provide a good fit around the visor and is sewn around its periphery except at the areas of the openings 20 and except for the end 22. The end 22 is left open to allow insertion of the visor body 10 into the sock 16. Once the sock is positioned over the visor body 10, the end 22 can be secured by sewing or other fastening method. The map band 18 is assembled to the visor after the sock has been inserted and positioned.

As best shown in FIG. 3 the map band 18 has a fastening strip 32 along each of its lateral edges. The fastening strip 32. preferably an extruded plastic piece, is sewn into the ends of the map band 18 and includes a flexible locking tang 24. best illustrated in FIG. 4.

FIG. 4 is a cross section of the assembled visor illustrating the sock 16 in position around the visor body 12, and the fastening edges of the map band inserted through the openings of the visor sock 20 and into the slots 14 of the visor body. As shown in FIG. 4 the locking tang 24 is inserted through the slot 14 such that it engages a ledge within the interior portion of the visor. The material of the map band 18 is sufficient elastic to allow for the assembly and will remain taught once assembled, but provides the desired stowing capacity. It should be appreciated that the locking strip 32 on the map band could have a pair of opposing locking tangs 24 to secure the map band in place within the slots 14, or that the tang 24 could be located on the opposing side from that illustrated in FIG. 4. Further, it should be appreciated that the locking strips 32 could be replaced with a plurality of locking mechanisms.

While it may be apparent that the preferred embodiment of the invention disclosed are well calculated to fill benefits, objects or advantages of the present invention, it should be appreciated that the invention is susceptible to modification, variations and change without departing from their proper scope of the invention as shown.

What is claimed is:

1. A visor assembly comprising;

a visor body having a generally planar front and back surfaces and opposing top and bottom surfaces; said body further having a pair of opposing openings in said top and bottom surfaces for receiving an accessory strap;

a visor body cover substantially conforming to at least a portion of said visor body and generally comprising two fabric panels substantially joined at their top and bottom edges and a first side edge, and having a primary opening at a second side edge, said panels of said cover being unattached at said top and bottom edges in the vicinity of said visor body openings;

a stretchable fabric accessory strap having two ends each inserted through said cover and into one of said visor body openings.

2. The visor assembly of claim 1 wherein said accessory strap visor body further comprises an internal ledge at least partially around the periphery of at least one of said visor body openings and further comprises at least one flexible locking tab for insertion into one of said visor body openings engaging said ledge.

3. The visor assembly of claim 1 wherein said visor body further comprises a mirror opening in one planar surface for receiving a minor assembly, and said visor body cover having an opening in one of said panels substantially aligning with said mirror opening.

4. A visor assembly comprising:
a visor body having a generally planar front and back surfaces and opposing top and bottom surfaces, said body further having a pair of opposing openings in said top and bottom surfaces forming an internal ledge at least partially around the periphery of at least one of said visor body openings for receiving an accessory strap;

a stretchable fabric accessory strap having two ends each having flexible locking tab for insertion into one of said visor body openings to engage said ledges.

5. The visor assembly of claim 4 further comprising a visor body cover substantially conforming to at least a portion of said visor body and generally comprising two fabric panels unattached at top and bottom edges in the vicinity of said visor body openings.

6. The visor assembly of claim 4 wherein said visor body further comprises a mirror opening in one planar surface for receiving a mirror assembly.

7. A visor assembly comprising:
a visor body having a generally planar front and back surfaces and opposing top and bottom surfaces, said body further having a pair of opposing openings in said top and bottom surfaces for receiving an accessory strap;

a visor body cover substantially conforming to at least a portion of said visor body and generally comprising two fabric panels substantially joined at their top and bottom edges and a first side edge, and having a primary opening at a second side edge, said panels of said cover being unattached at said top and bottom edges in the vicinity of said visor body openings;

a stretchable fabric accessory strap having two ends each inserted through said cover and into one of said visor body openings; and a minor opening in one planar surface for receiving a mirror assembly, and said visor body cover having an opening in one of said panels substantially aligning with said mirror opening.

8. The visor assembly of claim 1 wherein said accessory strap visor body further comprises an internal ledge at least partially around the periphery of at least one of said visor body openings and further comprises at least one flexible locking tab for insertion into one of said visor body openings engaging said ledge.

9. The visor assembly of claim 4 wherein said visor body further comprises a mirror opening in one planar surface for receiving a mirror assembly, and said visor body cover having an opening in one of said panels substantially aligning with said mirror opening.

\* \* \* \* \*